(12) United States Patent
Begum et al.

(10) Patent No.: US 9,325,721 B2
(45) Date of Patent: Apr. 26, 2016

(54) RESTRICTING ACCESS TO OBJECTS CREATED BY PRIVILEGED COMMANDS

(75) Inventors: Hussaina N. Begum, Andhra Pradesh (IN); George M. Koikara, Bangalore (IN); Manjunath A. Pattanshetti, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1883 days.

(21) Appl. No.: 12/409,141

(22) Filed: Mar. 23, 2009

(65) Prior Publication Data

US 2010/0242083 A1 Sep. 23, 2010

(51) Int. Cl.
  G06F 7/04 (2006.01)
  H04L 29/06 (2006.01)
  H04L 9/32 (2006.01)
  G06F 21/62 (2013.01)
  G06F 21/31 (2013.01)

(52) U.S. Cl.
  CPC .......... *H04L 63/105* (2013.01); *G06F 21/6218* (2013.01); *G06F 21/31* (2013.01); *G06F 2221/2141* (2013.01); *H04L 63/08* (2013.01)

(58) Field of Classification Search
  CPC ... H04L 63/08; H04L 63/105; G06F 21/6218; G06F 21/31
  USPC ......................... 726/2, 27; 713/165, 166, 168
  See application file for complete search history.

(56) References Cited

U.S. PATENT DOCUMENTS

| 6,886,100 | B2 | 4/2005 | Harrah et al. |
| 7,124,192 | B2 | 10/2006 | High, Jr. et al. |
| 7,185,192 | B1 * | 2/2007 | Kahn ............................. 713/155 |
| 7,702,693 | B1 * | 4/2010 | Aiyagari et al. ............... 707/785 |
| 2002/0026592 | A1 | 2/2002 | Gavrila et al. |
| 2006/0047657 | A1 | 3/2006 | Frieder et al. |
| 2007/0240231 | A1 | 10/2007 | Haswarey et al. |
| 2007/0261124 | A1 * | 11/2007 | Centonze et al. ................ 726/27 |
| 2007/0266006 | A1 * | 11/2007 | Buss ................................. 707/3 |
| 2009/0019516 | A1 * | 1/2009 | Hammoutene et al. ............ 726/1 |
| 2010/0030975 | A1 * | 2/2010 | Murray et al. ................. 711/154 |

OTHER PUBLICATIONS

Chandramouli Ramaswamy, et al., "Role-Based Access Control Features in Commercial Database Management Systems", pp. 1-9. www.csrc.nist.gov/groups/SNS/rbac/documents/design_implementation/RBAC_DBMS_Comparison.pdf.

\* cited by examiner

*Primary Examiner* — Aravind Moorthy
(74) *Attorney, Agent, or Firm* — Garg Law Firm, PLLC; Rakesh Garg; Parashos T. Kalaitzis

(57) ABSTRACT

A method and system for restricting access to objects created by privileged commands. In an RBAC environment, execution of certain privileged commands creates objects, which typically, have traditional access permissions based on the user ID and not the role. To enhance security of these objects, a new security attribute is introduced. The security attribute can be associated to the privileged command. Therefore, whenever a privileged command creates an object, the security attribute associated with the privileged command is applied on the object. The security attribute can mask the traditional access permissions of the object, and modify the access permissions, which can be stored along with the object. An AND operation can be performed on the traditional access permissions and the security attribute, to determine the modified permissions of the object. Further, an authorized user can modify, add, delete, or customize the security attribute at any time.

20 Claims, 6 Drawing Sheets

| DEFAULT ACCESS PERMISSIONS 202 | UMASK 204 | MODIFIED ACCESS PERMISSIONS 206 |
|---|---|---|
| 775 | 025 | 750 |
| 775 | 027 | 750 |
| 600 | 177 | 600 |
| 700 | 077 | 700 |
| 777 | 022 | 744 |

FIG. 2

RESTRICTING ACCESS TO OBJECTS CREATED BY PRIVILEGED COMMANDS

TRADEMARKS

IBM® is a registered trademark of International Business Machines Corporation, Armonk, N.Y., U.S.A. Other names used herein may be registered trademarks, trademarks or product names of International Business Machines Corporation or other companies

TECHNICAL FIELD

Embodiments of the invention relates to Role-based Access Control (RBAC) Systems, and more specifically, to methods for restricting access to objects created by privileged commands in an RBAC environment.

BACKGROUND OF THE INVENTION

Security administration can be costly and prone to errors as administrators usually specify access control for each user on a system, individually. With Role-based Access Control (RBAC), security is managed at a level that corresponds closely to an organization's structure. RBAC regulates access to computers or network resources based on roles of the users within the organization. In this context, access is the ability of a user to perform a specific task, such as view, create, or modify a file. Generally, roles are defined according to existing roles within an organization, such as job position, authority, or responsibility. Because it reduces the complexity and cost of security administration in organizations, RBAC continues to be a prominent model for access control.

Typically, in RBAC, users are assigned one or more roles, and each role is assigned one or more privileges or permissions that permit users to perform specific tasks. Therefore, to manage security in RBAC systems, users can perform only the functions associated with their roles. When properly implemented, RBAC enables users to carry out a wide range of authorized tasks by dynamically regulating their actions according to flexible functions, relationships, and constraints. In addition, in the RBAC environment, authorized users can easily create, change, or delete roles as the needs of the organization evolve, without having to individually update the privileges or authorizations for every user.

In RBAC systems, different administrative functions can be assigned to different roles, thereby distributing the administrative functions amongst a number of users. To allow this distribution to happen, most operating systems outline certain commands that allow some roles to perform administrative functions. These commands can be called privileged commands, as they allow certain authorized roles to perform privileged functions relating to system management and security administration, such as creating filesystems, rebooting the system, modifying roles and permissions, and so on. Some privileged commands can create certain objects, such as files, directories, and so on, and in RBAC, these dynamically-created objects typically have traditional access permissions (i.e., the object is owned, and access permissions governed, by the user that executed the privileged command, and not by the user's role). Access permissions are typically presented in a 10-bit format, where the first bit indicates the type of object, the next three bits indicate the permissions for the owner, the following three bits indicate permissions for the group, and the final three bits indicate permissions for other users. For example, the access permissions could be -rwxrwr-, which indicates that the type of object is a file, the owner has read (r), write(w) and execute(x) permissions, group members have only read (r) and write (w) permissions (a '-' represents absence of a permission), while others have only read (r) permissions.

Traditional access permissions are assigned according to the user, not the role, and therefore, unauthorized users can be allowed access to the objects. As a result, using traditional access permissions in the RBAC system can create a security gap, where, in certain situations, users could exploit the vulnerability of the RBAC system. For instance, if the traditional access permission of the created object is '-rwxr-xr-: user A: staff' then the user A has read (r), write (w), and execute (x) permissions for the object, and the group 'staff' has read (r) and execute (x) permissions for the object, which in this case, is a file. In this case, an unauthorized user belonging to the group 'staff' can copy the entire object using any utility as the unauthorized user has read (r) and execute (x) permissions for the object. Here an unauthorized user can be a user that does not have the right authorization according to his role, to access the object. Therefore, the assignment of traditional access permissions in RBAC can lead to an information leak, which could raise security issues.

Typically, to overcome this potential security gap, users have to explicitly change the access permissions of the objects, to provide security for the objects. Since a user has to manually change the access permissions, errors can occur, or users may forget to change the default access permissions. Furthermore, in certain cases, the users may not set the right access permissions. In addition, as users change access permissions, there is no uniformity in the assigned access permissions, which can again lead to security breaches.

BRIEF SUMMARY OF THE INVENTION

Embodiments of the invention are directed to methods and systems for restricting access to objects that are created by privileged commands, in an RBAC environment.

In a first embodiment, a method for restricting access to objects created by a privileged command is described. The method includes retrieving default access permissions of an object. The object can have default access permissions, corresponding to an authorized user that invoked the privileged command. The method further includes obtaining a security attribute corresponding to the privileged command, such that the security attribute determines which default access permissions are to be blocked. In addition, the method includes a step of modifying the default access permissions of the object using the security attribute.

In a second embodiment, a system for restricting access to objects created by a privileged command is described. The system includes a memory and a processing device that are operatively coupled to identify an object created by an authorized user through the privileged command. The object can have default access permissions corresponding to the authorized user. The system further obtains a security attribute, and the value of the security attribute can correspond to access permissions for the privileged command. Further, the system can modify the default access permissions of the object using the security attribute.

BRIEF DESCRIPTION OF THE DRAWINGS

FIG. 2 illustrates exemplary modified access permissions based on default access permissions and security attributes of some embodiments of the claimed invention.

DETAILED DESCRIPTION OF THE INVENTION

Figure 1:
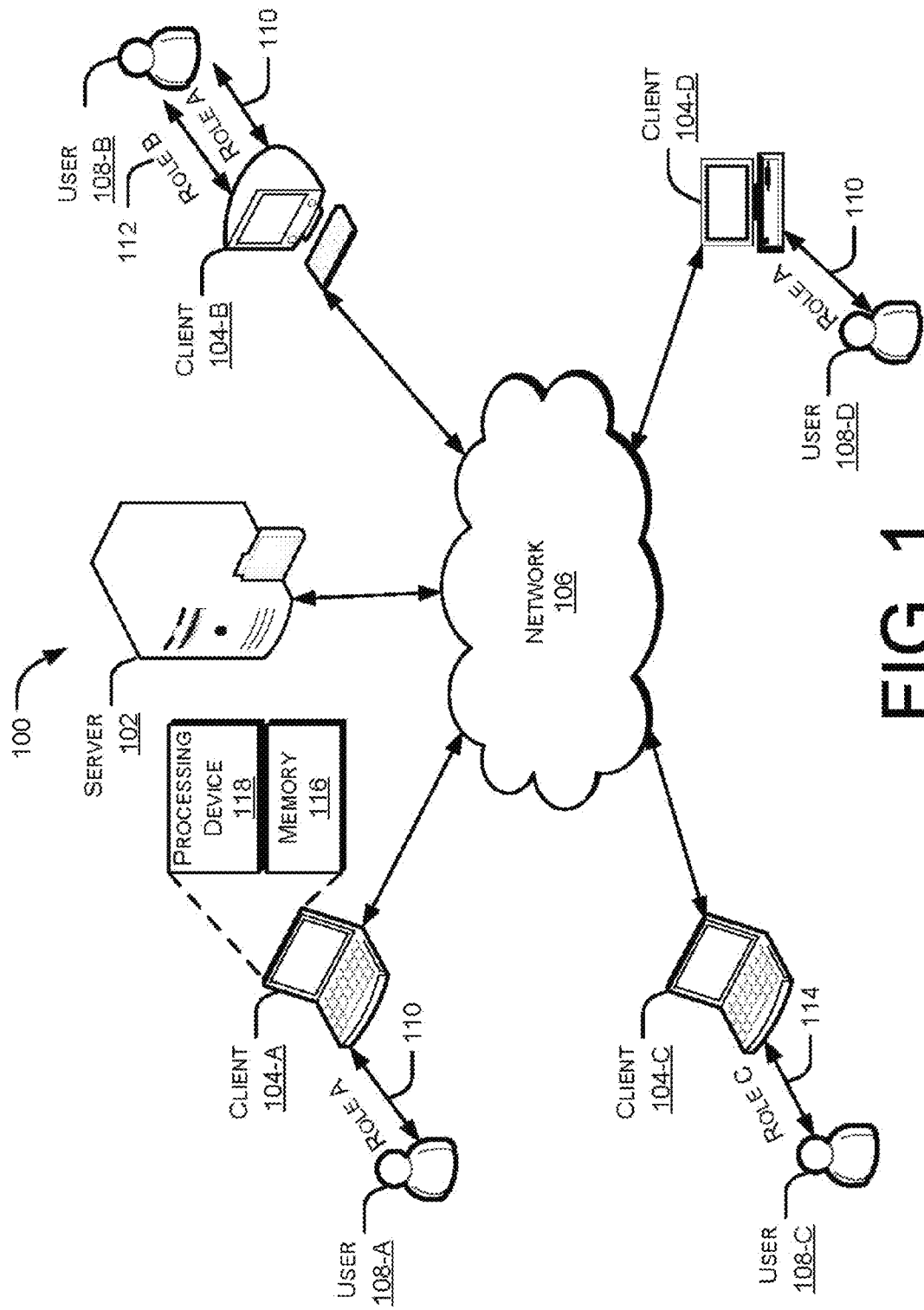
FIG. 1 is a block diagram illustrating an embodiment of an environment in which the invention may operate.

The following detailed description is made with reference to the figures. Preferred embodiments are described to illustrate the claimed invention, not to limit its scope, which is defined by the claims. Those of ordinary skill in the art will recognize a variety of equivalent variations of the description that follows.

The following terms are used throughout this document and are defined here for clarity and convenience.

Role-Based Access Control (RBAC): An approach to access control, whereby usernames are associated with roles (or functional positions) within an organization or process, rather than with individual users. In turn, roles are assigned certain authorizations and privileges that allow users to perform certain tasks required for their roles. The authorizations and privileges are streamlined according to the roles of the users.

Privileged commands: Commands that aid in performing certain administrative functions. In RBAC, these commands typically create, delete, or modify system files. Privileged commands are typically assigned to roles that have a high level of authority in an organization, or to system administrators. For example, privileged commands can be used to format disks, reboot the system, create or remove devices, modify file systems, and so on.

Permission: A capability associated with a username or a role, which allows access to system resources.

Authorization: A right given to a user or a role to perform a certain task.

Privilege: A delegation of authority over a computer system. A privilege is a permission to perform an action. Examples of various privileges include the ability to create a file in a directory, ability to read or delete a file, ability to access a device, ability to read or write to a socket for communicating over the Internet, and so on.

umask (abbreviated from user mask): A command and a function in UNIX environment, which modifies the default permission modes for newly created files and directories of a process. Typically, the umask indicates the permissions that have to be blocked or removed from the default access permissions.

Embodiments of the claimed invention restrict access to objects created by execution of privileged commands. One embodiment of the claimed invention introduces a security attribute. The security attribute can mask the default access permissions of an object, with access permissions assigned to the privileged command that created the object. An authorized user can assign the security attribute to the privileged commands, and based on the type of each privileged command, and the type of restrictions that are required, the user can modify/customize the security attribute for different privilege commands. In one implementation, the privileged commands can be stored along with other privileged command attributes.

In another implementation, the security attribute can be applied to the default access permissions of the object, when the object is created. The modified access permissions can then be stored in memory. The username of any user requesting access to the file can be compared with the modified access permissions to determine whether the user is allowed access to the file.

In a further implementation, an AND operation can be performed on a complement of the security attribute and the default access permissions to obtain the modified access permissions. In another implementation, an XOR operation can be performed on the security attribute and the default access permissions of the object, to obtain the modified access permissions.

Exemplary Operating Environment

FIG. 1 illustrates an exemplary environment in which the invention may operate. The environment can be a role-based access control (RBAC) environment 100 (hereinafter referred to as RBAC environment 100), with one or more server device(s) 102 (server 102), and client devices 104-A, 104-B, 104-C, and 104-D (hereinafter referred to as clients 104). The servers 102 and the clients 104 can be interconnected using a network 106. Further, the clients 104 can have one or more users 108-A, 108-B, 108-C, and 108-D (hereinafter referred to as users 108) that can access objects on the server 102 or on any of the clients 104. In the RBAC environment 100, the users 108 can access network resources only through roles, such as roles 110, 112, and 114. Users can be assigned one or more roles as depicted in FIG. 1, where the user 108-A is assigned role-A 110, while the user 108-B is assigned role-A 110, and role-B 112. Similarly, the users 108-C and 108-D are assigned role-C 114 and role-A 110, respectively.

The network 106 can be any wired or wireless means known in the art that can connect the server 102 and the clients 104. The network 106 can be a local LAN, a WAN, the Internet, and so on. It would be apparent to those skilled in the art that the type of the network 106 does not limit the scope of the invention in any manner. In one implementation, the network 106 can be a private network. For example, the network 106 can be a company network, including thousands of office PCs, various servers, and other computing-based devices spread throughout several countries. Alternately, the network 106 can include a home network with a limited number of PCs belonging to a single family. It will be appreciated that the network 106 can be any other type of a network; for example, in some implementations, the network 106 can be a single computing device with a number of different access permissions for different users or roles. Further, the RBAC environment 100 can function on any operating system known in the art, such as the IBM AIX® operating system, the Microsoft Windows® operating system, the MAC operating system, and so on.

In a further implementation, the roles (such as roles 110, 112, and 114) assigned to users can be based on authority or responsibility of a user in an organization. For example, the users 108-A and 108-D can be developers working on a same project, therefore, they have the same roles (role-A 110) and the same privileges in the system. On the other hand, the user 108-B can be a manager of the team; therefore, he is assigned role-A (which is same as the role assigned to the users 108-A and 108-D) as well as role-B, which gives the user 108-B additional privileges and authorizations. The user 108-C can be an administrator with the role-C 114 that gives the user 108-C maximum privileges and authorizations.

In the RBAC environment 100, the roles 110, 112, and 114 are assigned privileges, permissions, and authorizations. Therefore, the users 108 can only perform activities assigned to their roles. Because the activity of users is restricted based on their roles, an easily modifiable, and maintainable security structure can be achieved. The RBAC environment 100 depicted in FIG. 1 includes the clients 104 and the server 102, but in other implementations of the RBAC environment 100, a server is not essential (i.e., the environment can include just an interconnection of the clients 104). In other embodiments, a single client 104 is sufficient for embodiments of the invention to operate. In still other embodiments, one or more standalone databases can be a part of the RBAC environment 100.

Further, each of the server 102 and the clients 104 is at least equipped with a memory and a processing device (such as a memory 116 and a processing device 118 in the client device 104-A), and is further equipped with any additional components as needed for a commercial embodiment. The memory 116 and the processing device 118 can have any suitable physical implementation. These components are further operatively coupled and can be adapted, arranged, configured, and designed to perform methods in accordance with the teachings herein, for example, as illustratively described with reference to FIGS. 2-7.

Traditional Access Permissions

In order to understand the claimed invention, some prior knowledge about traditional access permissions in UNIX is required. In UNIX, when a user, such as the user 108-C, executes a privileged command, certain objects may be created. These objects can be files, file systems, directories, or any other objects known in the art. Typically, the default access permissions of the objects created by execution of the privileged commands are traditional access permissions. The traditional access permissions can be permissions such as read, write, and execute permissions.

The traditional access permissions will be explained in the following section with reference to the UNIX operating system. However, it will be appreciated that access permissions of this type can be explained with reference to any other operating system known in the art. Each operating system has its own syntax, commands, file names, etc., but the basic concept of access permissions remains the same in typical operating systems.

UNIX typically assigns 9-bit access permissions. The bits are typically written as a 3-digit octal number, in which each digit represents permissions for an owner, a group member, or any other user. The first digit represents the access permissions for the owner of the object, so that, for example, the digit 7 indicates that the owner has all permissions for the object. The three binary bits of the octal digit can represent individual permissions for the owner, such as read, write, and execute permissions. For example, the binary value of the digit 7 is 111, which indicates that the owner of the object can read, write on/modify, and execute the object. The next octal digit represents the access allowed for members of a group to which the owner belongs. Any member of the owner's group can gain access to the object based on the second octal digit. Finally, the last octal digit represents access permissions for any other user.

An authorized user, such as the owner of the object or an administrator, typically assigns the access permissions. In some situations, the access permissions can be set for roles, instead of individual users. In other situations, the access permissions can be preset for processes, or an environment, so all the objects created in that process or environment will automatically have the access permissions assigned to that process or environment. An authorized user can modify the access permissions of an object at any time after its creation.

As discussed previously, the default access permissions of objects created during execution of a privileged command are in traditional form. The assignment of traditional access permissions results in security vulnerability in the RBAC environment 100. For example, an authorized user, such as the user 108-B (a manager) executes a privileged command (using role B), thereby creating a file system, and the file system has traditional access permissions. For instance, the traditional access permissions of the file system is 750, which implies that the owner has complete access, while users 108-A and 108-D (who are the group members-developers) are allowed to read and execute the file system, while other users have no access. In this case, if a member of the group (say user 108-A or 108-D), who is not an authorized user (since the user does not have access to privileges provided by the role B 112), tries to access the file system, he will be allowed to. Therefore, traditional access permissions can cause a serious security breach, as unauthorized users can still access the objects.

The Security Attribute: Umask

To overcome the potential security breach caused by the default access permissions assigned to objects created by privileged commands, some embodiments of the claimed invention introduce a security attribute. The security attributes can be assigned to the privileged commands, based on certain conditions, such as the kind of protection required, the sensitivity of the objects created, and so on. Therefore, different privileged commands can have different security attribute values. The security attribute can change the default access permissions of objects by masking the permissions created during execution of the privileged commands. Therefore, the security attribute provides a means to obtain desired access permissions, and to enhance the security of the objects considerably.

Based on the type of protection required for objects created by a particular privileged command, an authorized user can configure, modify, or customize the security attribute. In one implementation, the security attribute can be applied to the created object whenever a 'create' or 'open' command is issued, or whenever a privileged command creates an object. The security attribute and its application will be discussed in detail with reference to FIGS. 2-7.

To understand the security attribute further, an exemplary implementation will be provided with reference to the UNIX operating system. However, it will be appreciated that the UNIX system is only used here as an exemplary operating system to explain the security attribute further, and any other operating system known in the art can be used. In one implementation, the security attribute can be a umask. The umask ("user file-creation mode mask") can be a three-digit octal number that determines the file permission for objects created by the privileged command. In one implementation, the three-digit octal number can be represented as a 9-bit binary number. The first three bits (the first octal digit) of the umask represent read, write, and execute permissions for the owner, the next three bits (the second octal digit) indicate the read, write, and execute permissions for the group, and the last three bits (the thirst octal digit) can indicate the read, write, and execute permissions for the others. Further, every privileged command can have its own umask, which can be stored in a file along with other attributes of the privileged command.

As known in the art, UNIX privileged commands are stored in a Privileged Command Database (PCD), which includes all the privileged commands that are functional in the UNIX operating system. Along with the privileged commands, the PCD can also store certain attributes associated with the privileged commands. An example of the privileged command attributes can be an access authorizations attribute, providing information about all the roles that have any of the authorizations associated with the privileged command, to run the command. Other examples, among those that will be clear to persons of skill in the art, can include authorized privileges attribute-, indicating the privileges that are assigned to a process on a specific authorization basis and an attribute that includes a list of privileges-assigning privileges to the process only if an authorized user invokes the command.

The PCD stores the privileged commands and their associated attributes in a stanza file. Each stanza file in the PCD can be identified by the privileged command name, and each stanza file can include attributes in the Attribute=Value form. For example, if a privileged command called 'myprog' existed in the PCD, then the stanza file for this command could be represented according to table 1.

TABLE 1

Typical PCD stanza file

/usr/bin/myprog:
    accessauths = Auth1, auth2
    authprivs = auth3=priv3
    innateprivs = priv1, priv2
    secflags = flag1

In the stanza file of the Table 1, the first line indicates the privileged command name ('myprog'), while the second line indicates the access authorizations for the privileged command 'myprog'; the authorizations mentioned after the 'equal to' sign (=) are required by a user to access the privileged command. The third line points out the authorized privileges for the privileged command. The privileges mentioned in the value field are the privileges that are assigned to any process that is activated due to the execution of the privileged command 'myprog'. A description of innate privileges follows in the fourth line, which specifies the file name of the message catalog that contains the one-line description of the authorization. Finally, the stanza file ends with a security flag attribute that specifies a list of file security flags. The security flag attribute can load the maximum process privileges assigned to the command into an effective privilege set upon execution of the command. Further, it will be appreciated that the stanza file can include other attributes and attribute values.

In one embodiment, the umask attribute introduced in the claimed invention can be added as an attribute of the privileged command. To this end, the umask can be added in the PCD along with a list of already existing attributes assigned to the privileged command. With the addition of the umask attribute in the PCD, the stanza file depicted in table 2 could represent a stanza of the PCD according to the claimed invention.

TABLE 2

PCD stanza file according to the claimed invention

/usr/bin/myprog:
    accessauths = auth1, auth2
    authprivs = auth3=priv3
    innateprivs = priv1, priv2
    secflags = flag1
    umask = xyz As depicted in the stanza file of Table 2, the last line is the umask attribute. The value 'xyz' can vary according to the privileged command. The value of the umask can be a three-digit octal number, with the first digit representing permissions to be blocked for the owner, the second digit representing permissions to be blocked for the group, while the third digit represents permissions that are to be blocked for other users.

The umask specifies the permissions that should not be given by default to the objects created by the privileged commands. A umask Bit 'one' indicates that the default access permission in that bit position should be removed, while a umask bit 'zero' indicates that the default access permission in that bit position should not be removed. For example, if the umask value is 027, it indicates that all the permissions for other users should be removed, and the write permissions should be removed for group members. Table 3 indicates the permissions that should be removed for every octal digit of the umask.

TABLE 3

Blocked permissions corresponding to umask values

| Umask Octal | Umask Binary | | | Permissions to be blocked |
|---|---|---|---|---|
| | R | W | X | |
| 0 | 0 | 0 | 0 | None |
| 1 | 0 | 0 | 1 | Execute |
| 2 | 0 | 1 | 0 | Write |
| 3 | 0 | 1 | 1 | Write and Execute |
| 4 | 1 | 0 | 0 | Read |
| 5 | 1 | 0 | 1 | Read and Execute |
| 6 | 1 | 1 | 0 | Read and Write |
| 7 | 1 | 1 | 1 | Read, Write, and Execute |

In addition, Table 3 depicts the binary value of each of the octal number, and the binary values represent read, write, and execute permissions for the user, the group, or other users.

FIG. 2 illustrates a table 200 including few examples of modified access permission values based on the default access permissions and the umask value. The table 200 depicts some exemplary default access permissions 202, exemplary umask 204 values, and the resulting exemplary modified access permissions 206, based on Table 3. For example, in the first row, the default access permission 202 is 775, while the umask 204 value is 025; therefore, according to Table 3, since the first digit is zero, no permission for the user will be blocked and the modified access permissions 206 for the owner will be 7. The second umask digit is 2, and according to Table 3, write permission for the group should be blocked, so the modified access permissions 206 will be 5. Finally, the third digit is 5, which indicates that read and execute permissions should be blocked for any other users. Since the other users had only read and execute permissions originally, all their permissions become '0'. It can be appreciated that other examples in the table 200 can also be derived from Table 3.

In one implementation, a umask complement value can be ANDed with the default access permission values to obtain the modified access permission values. It should be understood that this operation is one implementation and other logical operations can be performed to achieve the desired result in other implementations. Examples of other logical operations that can be used are XOR, OR, NOT, and so on. In order to perform the logical operation, the octal digits can be converted into binary.

Figures 3, 4:
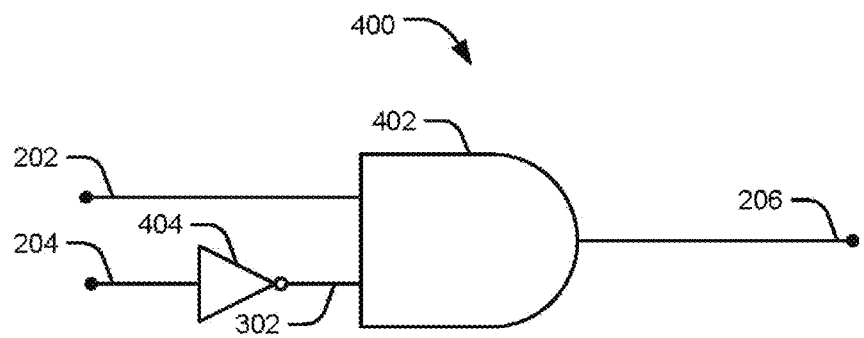
FIG. 3 illustrates an AND operation truth table of some embodiments of the claimed invention.
FIG. 4 illustrates an exemplary logic circuit performing an AND operation of some embodiments of the claimed invention.

FIG. 3 illustrates a truth table 300 of all the possible bit values of the default access permissions 202, the umask 204, and the resulting bits of the modified access permissions 206, according to the AND operation. As seen from the truth table 300, the modified access permissions 206 bit values are obtained by an AND operation of the default access permissions 202 bit, and a umask complement 302 bit value. That result occurs because the umask 204 specifies the permissions that should not be given to the object, so a umask bit value of '1' means that the permission corresponding to that bit should be removed from the access permissions. Therefore, a bit value of '1' in the umask 204 bits will always remove the permissions, regardless if the default access permissions 202 of the object was '1' or '0'. This characteristic of the umask can be illustrated with row 2, and row 4 of the truth table 300. In both the cases, the umask 204 has a value '1', so irrespective of the default access permission 202 bit value ('0' and '1'); the modified access permission 206 bit will be '0'.

An exemplary logic circuit 400 that can perform the AND operation on the default access permissions 202 and the umask complement 302 is illustrated in FIG. 4. As can be seen, the default access permission 202 bits and the umask complement 302 bits are inputs to an AND gate 402. The umask complement 302 bit can be obtained by passing the umask 204 bits through a NOT gate 404. The NOT gate 404 simply inverts the umask 204 bit values. The output of the AND gate 402 are the modified access permissions 206 bits.

Figure 5:
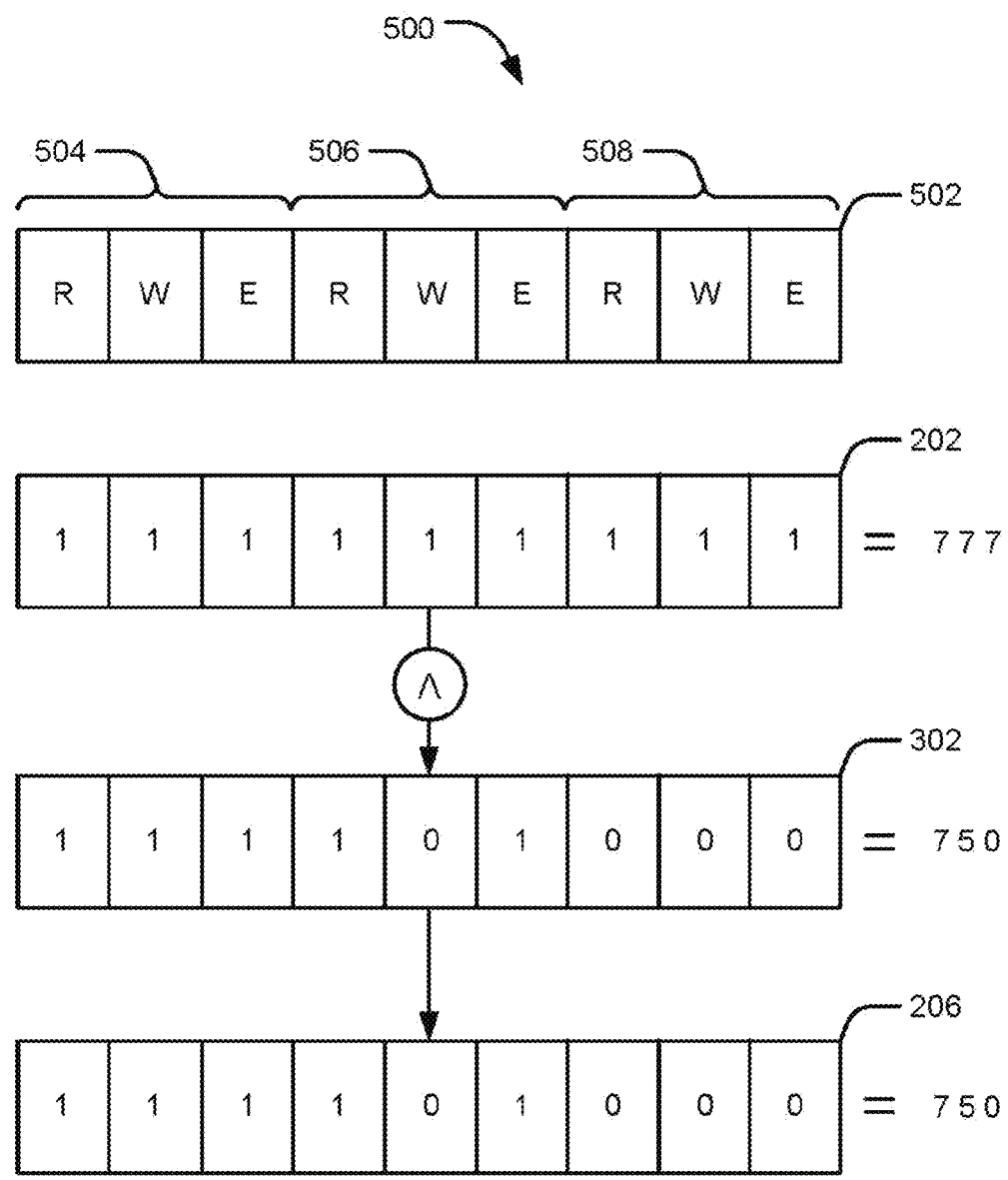
FIG. 5 is a block diagram depicting an exemplary operation to obtain modified access permissions according to some embodiments of the claimed invention.

Turning now to FIG. 5, which depicts a block diagram 500 illustrating an exemplary AND operation according to some embodiments of the claimed invention. FIG. 5 includes an access permission format 502, the default access permissions 202, the umask complement 302, and the modified access permissions 206. The access permission format 502 includes read, write, and execute permissions for an owner 504, a group 506, and other users 508. According to the access permission format 502, the default access permissions 202 are depicted. The default access permissions 202 in this example are 777 (octal value), which convert into binary 111111111. Therefore, the default access permissions 202 indicate that all users have full access to the object.

The umask 204 value is 027 in this example, which when converted to binary yields 000010111, which implies that no permissions are to be blocked for the owner, write permissions are to be blocked for the group, and all permissions for other users are to be blocked. The umask complement 302 can then be 750 or 111101000. The AND operation is carried out between the default access permissions 202 and the umask complement 302. The first three default access permission 202 bits are 111, while the first three umask complement 302 bits are 111, and the modified access permission 206 value is 111, as represented in the third event of the truth table 300. Similarly, the next three default access permission 202 bits are 111, while the umask complement 302 bits are 101, then according to the truth table 300, the modified access permission 206 bits are 101. Finally, the last three default access permission 202 bits are 111, and the umask complement 302 bits are 000, this results in modified access permission 206 values 000.

The resulting modified access permissions 206 are 111101000, with an octal value 750.

In certain scenarios, the RBAC environment 100 can have other umask values as well. For example, umask values can be set for some processes, and umask values can be set for particular roles or users (access permissions for all objects created will be modified by the umask), and so on. In this scenario, multiple implementations are possible, in one implementation, the security attribute of the claimed invention will be independent of the other umasks of the authorized user's environment, and the security attribute of the claimed invention will only be valid if the authorized user executes a privileged command. Therefore, if the user creates an object then the user's umask will be applied but when the user invokes a privileged command that creates any object, the privileged commands security attribute will take precedence, and the objects so created will have permissions as defined by the privileged command's security attribute.

In a second implementation, the processing device 118 can apply the umask with a more restrictive value on the object. For example, if an environment umask exists with a value 077, while privileged command umask for a command 'myprog' is 027, then if a user invokes the privileged command 'myprog' and an object is created, the environment umask will be applied to the object instead of the command attribute as it is more restrictive.

In other implementations, the security attribute (umask 204) of a privileged command can be modified, added, or deleted by an authorized user at any point of time.

Exemplary Method(s)

Figure 6:
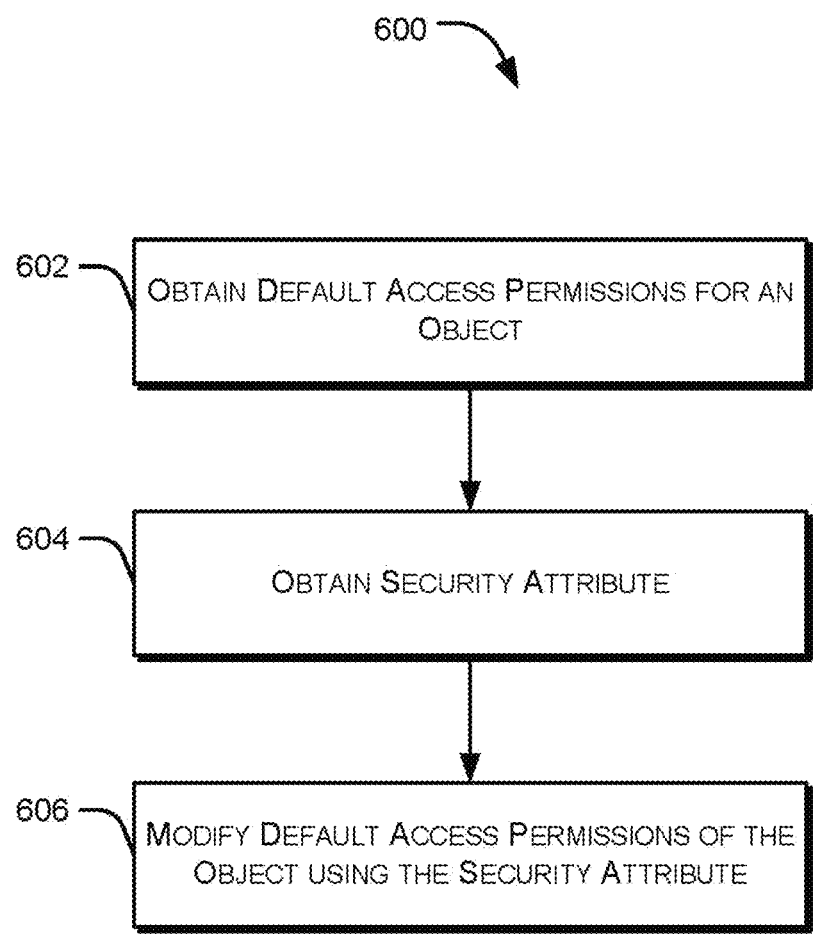
FIG. 6 is a flowchart of a method for restricting access to objects created by privileged commands.

FIG. 6 is a flowchart illustrating an exemplary method 600 for restricting access to objects created by privileged commands. The object can be a persistent object created when a privileged command was executed. The method 600 modifies the default access permissions of the object in order to restrict access to the object.

According to the method 600, the default access permissions of an object created by a privileged command, are retrieved (at step 602), along with a security attribute associated with the privileged command (at step 604). Once the default access permissions of the object and the security attribute are retrieved, the access permissions of the object can be modified using the security attribute (at step 606).

The created object can be a file, a directory, a folder, a system file, and so on. At step 602, the processing device 118 can retrieve the default access permissions 202 of the created object. In one implementation, the default access permissions 202 of the object can be stored as metadata associated with the object, stored in a convenient location, such as in the memory 116 of one of the clients 104, or the server 102, or any other device in the RBAC environment 100. One example of the metadata can be an inode file that exists in the UNIX system. Typically, an inode stores basic information about a file, directory, or other file system object. Each file in UNIX has an inode, identified by the inode number in the file system where it resides. Inode stores information about the files such as user and group ownership, access mode (read, write, execute permissions) and type of file. From the inode, the processing device 118 can obtain the default access permissions 202 of the object.

The security attribute can be obtained at step 604. In one embodiment, the security attribute (the umask 204) is stored in the memory 116, either at the clients 104 or at the server 102, or in a standalone database. Alternatively, the umask 204 can be stored in a PCD. The PCD grants access and powers to users for privileged commands. The database saves the authorization information for a particular privileged command as well as the privileges that are granted to the process if authorization checks succeed. When the database is stored locally, at one of the clients 104, the privileged commands can be stored in a file. In one implementation, the file can be the/etc/security/privcmds file of the UNIX system. It will be appreciated that in other operating systems known in the art, these commands can be stored in a different file, without departing from the scope of the invention. The privileged commands file can include stanzas of information (such as the stanza of Table 2), in the form of privileged command-versus-security attributes. In an embodiment, the umask 204 of the claimed invention can be an attribute of the PCD; therefore, the value of the umask 204 can be extracted from the PCD.

Moving now to step 606, once the processing device 118 has knowledge of the default access permissions 202 and the umask 204 associated with the object, the processing device 118 can make a comparison of the umask 204 with the default access permission 202. In one implementation, the comparison can be on a bit level (i.e.,—each access permission bit is compared with corresponding security attribute bit). Any logical operation can be performed on the bits to compare them, for example, a logical AND operation, a logical XOR operation, and so on. In one implementation, the AND operation described with reference to FIG. 4 and FIG. 5 can be performed. Once the bits have been compared, the modified access permissions 206 are obtained.

In an alternate embodiment, the different umask 204 values can be stored in a look-up table in the memory 116, along with the corresponding modified access permissions 206. The processing device 118 can then compare the umask 204 value of the privileged command with the look-up table and retrieve the modified access permissions 206.

If a user requests access to the object, the users ID is compared with the modified access permissions of the object. To this end, the processing device 118 determines the type of user from a list including the owner, the group, or others. To determine the type of user, the user's user ID is checked against the ownership ID of the object. In one implementation, the ownership ID of the object can be present in the inode of the object. The ownership ID can include information about the IDs of the owner of the object and the group members that are allowed access to the object. If the user ID matches the owner ID, then the modified access permissions corresponding to the owner are checked. Further, if the user ID matches any of the group member IDs, then the modified access permissions corresponding to the group are checked. If the user Id does not match any of the IDs in the ownership ID of the object, the modified access permissions of the others is checked.

Figure 7:
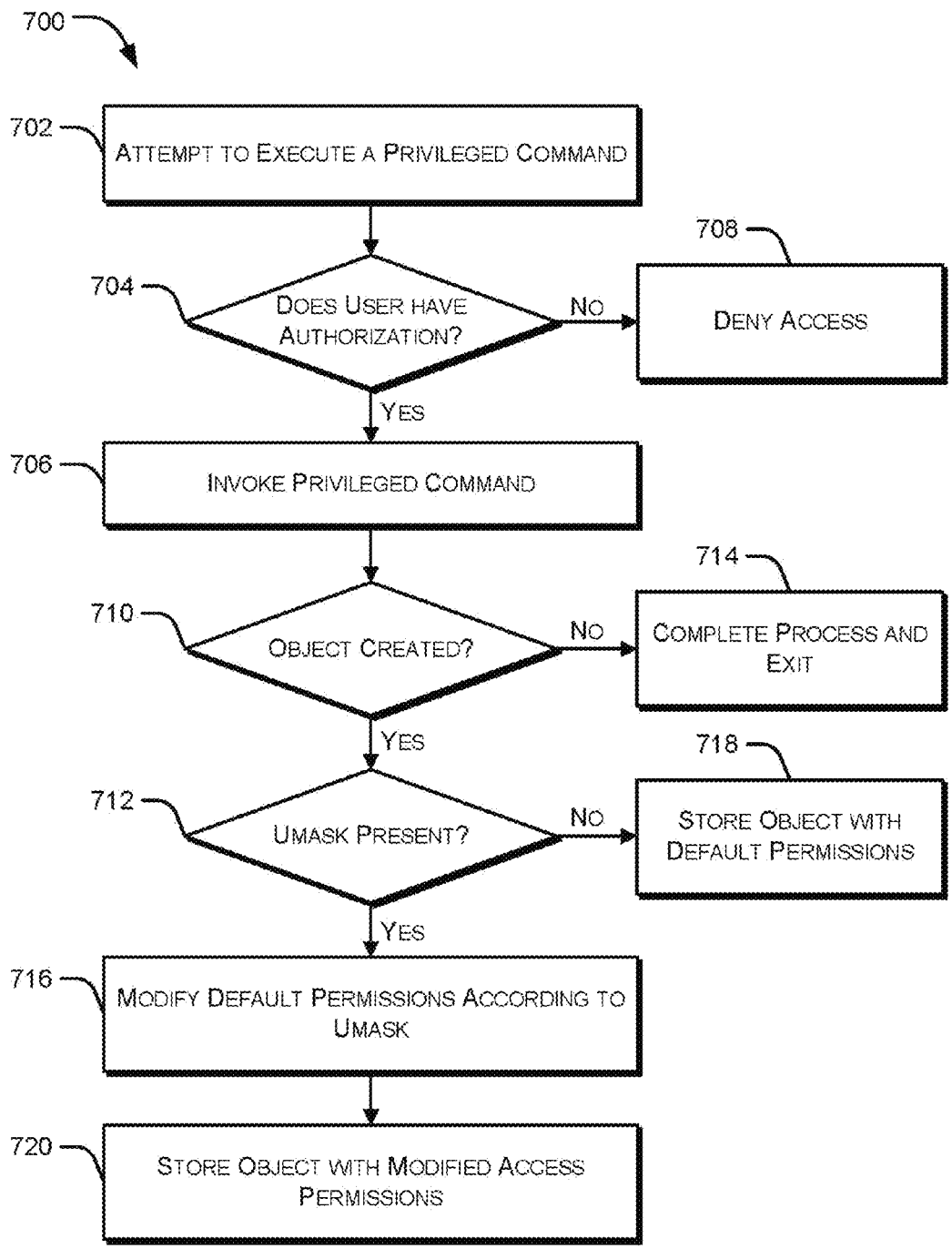
FIG. 7 is a flowchart of a method for modifying access permissions of an object created by a privileged command.

FIG. 7 illustrates an exemplary method 700 for method for modifying default access permissions of an object created by a privileged command.

At step 702, a user attempts to execute a privileged command. The user, such as user 108-A, can attempt to execute any privileged command stored in the memory 116 of one or more of the clients 104 or the server 102. In one implementation, information about the privileged command can be stored in the PCD.

At step 704, the processing device 118 determines whether the user 108-A has the necessary authorization to execute the privileged command. When the user 108-A on the RBAC environment 100 attempts to execute a privileged command, the processing device 118 first checks if the command is in the PCD. If the command exists in the database, a check is performed against the authorizations associated with the user's role and the value of the accessauths attribute for the command. If the role includes one of the authorizations listed, the user 108-A can run the command at step 706. If the role does not include any of the authorizations listed in the accessauths attribute, the user 108-A is denied access to the privileged command (step 708).

At step 706, the privileged command is executed. In one implementation, the processing device 118 can execute the privileged command at one of the clients 104, while in another implementation the privileged command can be executed at the server 102. Upon execution, the processing device 118 can perform additional authorization checks with the authorization-privilege pairs listed against an attribute of the privileged command. If the role includes one of the listed authorizations, the associated privilege(s) are also added to the privileged command process.

When the privileged command is executed, one or more processes can be activated, which might or might not create persistent objects. At step 710, the processing device 118 can determine whether an object was created due to the privileged command. In instances when a privileged command does not create any objects (no branch from step 710), the method 700 ends (step 714). On the other hand, if the execution of the process creates an object (yes branch from step 710) the processing device 118 checks if the umask 204 is present for the command, at step 712.

A determination is made whether the umask 204 exists for the privileged command at step 712. In one implementation, the processing device 118 checks the privileged command database for the umask 204. If the umask 204 is present, the method 700 moves to step 716. If the umask 204 is absent (no branch from step 712), the processing device 118 stores the object, in the memory 116, with the default access permissions 202 at step 718. In one implementation, at step 718, if a process umask is present, then the process umask can be applied on the default access permissions 202 of the object, and the modified access permissions can be stored in the memory 116.

At step 716, the default access permissions 202 of the object are modified with the umask 204. All the permissions (that need to be blocked) that are mentioned in the umask 204 are blocked from the default access permissions 202. The modification of the access permissions can be done according to the method as described in connection with the description of FIG. 3 to 5. In another implementation, if the umask for the process is more restrictive than the umask 204 for the privileged command, then the process umask can be applied on the default access permissions 202 of the object.

Finally, at step 720, the object is stored with the modified access permissions 206. In one implementation, the modified access permissions 206 can be listed in the inode of the object, and the object, along with its inode can be stored in the memory 116. Whenever a user (such as user 108-A) wants to access the object, the processing device 118 can extract the modified access permissions 206 from the inode, and make a determination whether the user 108-A is allowed access to the object or not.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the claimed invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, the order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. Furthermore, the methods can be implemented in any suitable hardware, software, firmware, or combination thereof.

What is claimed is:

1. A method for restricting access in a Role Based Access Control (RBAC) system, the method comprising:
   retrieving a default access permission of an object, the object being created by execution of a privileged command using a processor and a memory; and
   modifying, to form a modified access permission, the default access permission of the object using a security attribute corresponding to the privileged command.

2. The method of claim 1, wherein the security attribute indicates an access permission of the object to be blocked.

3. The method of claim 1, wherein the default access permission and the modified access permission are binary numbers, and the binary numbers comprise 9 bits.

4. The method of claim 3, wherein the default access permission and the modified access permission include three groups comprising three bits each.

5. The method of claim 4, wherein
   a first group of bits in the three groups represents read, write, and execute permissions for an owner;
   a second group of bits in the three groups represents read, write, and execute permissions for a group; and
   a third group of bits in the three groups represents read, write, and execute permissions for others.

6. The method of claim 5, further comprising:
   determining whether a user is allowed access to the object based on the modified access permission.

7. The method of claim 6, further comprising:
   determining a type of the user from a list including owner, group, and others by comparing a user ID with an ownership ID of the object; and
   providing access to the user based on one of the three groups of bits corresponding to the type of the user.

8. The method of claim 3, wherein a bit value 1 for a bit in the 9-bit binary number corresponds to blocking a corresponding access permission and a bit value 0 for the bit corresponds to allowing the corresponding access permission.

9. The method of claim 1, wherein using the security attribute comprises:
   identifying the security attribute corresponding to the privileged command, the security attribute being identified from a list of privileged command attributes.

10. The method of claim 1, wherein the security attribute is a binary number, the binary number comprises 9 bits, and the security attribute comprises three groups of three bits each, wherein
    a first group of bits in the three groups represents read, write, and execute permissions for an owner;
    a second group of bits in the three groups represents read, write, and execute permissions for a group; and
    a third group of bits in the three groups represents read, write, and execute permissions for others.

11. The method of claim 10, wherein comparing the security attribute with the default access permissions is based on a determination that value of the security attribute is greater than value of any masking attribute assigned to a user environment.

12. The method of claim 10, further comprising:
    comparing the security attribute with the default access permission by performing an AND operation on a default access permission bit and a complement of a security attribute bit.

13. The method of claim 10, further comprising:
    producing modified access permission bits, wherein producing the modified access permission bits comprises:
       producing a bit value 0 upon a determination that a security attribute bit is 0 and a corresponding default access permission bit is 0;
       producing a bit value 0 upon a determination that the security attribute bit is 1 and the corresponding default access permission bit is 0;
       producing a bit value 1 upon a determination that the security attribute bit is 0 and the corresponding default access permission bit is 1; and
       producing a bit value 0 upon a determination that the security attribute bit is 1 and the corresponding default access permission bit is 1.

14. The method of claim 1, wherein modifying the default access permission comprises producing a modified access permission bit by comparing a security attribute bit with a corresponding default access permission bit.

15. The method of claim 1, wherein the security attribute depends upon the privileged command, and the security attribute is customizable.

16. A system for restricting access to an object created by execution of a privileged command in a Role Based Access Control (RBAC) system, the system comprising:
    a memory and a processing device, operatively coupled to:
    identify the object created by an authorized user through the privileged command, wherein the object includes a default access permission corresponding to the authorized user;
    obtain a security attribute, wherein value of the security attribute corresponds to an access permission for the privileged command; and
    modify the default access permission of the object using the security attribute, forming a modified access permission.

17. The system of claim 16, wherein the security attribute is a umask attribute, and the security attribute is added to a privileged command database.

18. The system of claim 16, wherein the memory and the processing device are further operatively coupled to determine whether a user should be allowed access to the object based on the modified access permission.

19. The system of claim 16, wherein modifying the default access permission comprises performing an AND operation on the default access permission and a complement of the security attribute.

20. The system of claim 16, wherein the system is a role-based access control system.

* * * * *